(12) United States Patent
Westfall

(10) Patent No.: US 10,563,859 B2
(45) Date of Patent: Feb. 18, 2020

(54) APPARATUS FOR PROVIDING INDEPENDENTLY CONTROLLED INDIRECT LIGHTING AND AIRSTREAM TO AN INDIVIDUAL PASSENGER OF A MOTOR VEHICLE

(71) Applicant: FORD GLOBAL TECHNOLOGIES, LLC, Dearborn, MI (US)

(72) Inventor: Christopher Robert Westfall, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/971,433

(22) Filed: May 4, 2018

(65) Prior Publication Data

US 2019/0338942 A1 Nov. 7, 2019

(51) Int. Cl.
| | |
|---|---|
| *F21V 33/00* | (2006.01) |
| *B60Q 3/12* | (2017.01) |
| *F24F 7/04* | (2006.01) |
| *F24F 13/32* | (2006.01) |
| *B60H 1/34* | (2006.01) |

(52) U.S. Cl.
CPC ........... *F21V 33/0088* (2013.01); *B60H 1/34* (2013.01); *B60Q 3/12* (2017.02); *F24F 7/04* (2013.01); *F24F 13/32* (2013.01); *B60Q 2500/20* (2013.01)

(58) Field of Classification Search
CPC ............ B60H 1/34–3457; F24F 13/078; F24F 13/08–142; F24F 2013/1493; F21V 33/0088; B60Q 3/00–292; B60Q 3/50–59
See application file for complete search history.

(56) References Cited

U.S. PATENT DOCUMENTS

| | | | |
|---|---|---|---|
| 6,437,704 B1 * | 8/2002 | Nodinger ........... | B60H 1/00985 340/815.4 |
| 9,267,658 B2 | 2/2016 | Garcez da Silva et al. | |
| 2004/0166794 A1 * | 8/2004 | Pesch .................. | B60H 1/3414 454/152 |
| 2004/0171345 A1 * | 9/2004 | Pesch .................. | B60H 1/3414 454/319 |

(Continued)

FOREIGN PATENT DOCUMENTS

| | | |
|---|---|---|
| EP | 3231684 A1 | 10/2017 |
| JP | 2001199279 A | 7/2001 |
| JP | 2004306713 A | 11/2004 |

(Continued)

OTHER PUBLICATIONS

English Machine Translation of JP2001199279A.

(Continued)

*Primary Examiner* — Mariceli Santiago
(74) *Attorney, Agent, or Firm* — Vichit Chen; King & Schickli, PLLC

(57) ABSTRACT

An apparatus is provided for distributing indirect lighting and airflow to an individual passenger in a motor vehicle. That apparatus includes a vent body having an air inlet and an air outlet. An air valve is carried on the vent body. The air valve is displaceable between an open position and a closed position. A flexible air guide carried on the vent body is adapted to direct air from the air outlet toward the individual passenger.

17 Claims, 10 Drawing Sheets

(56) References Cited

U.S. PATENT DOCUMENTS

2009/0298406 A1\* 12/2009 Norbury, Jr. ............. B60H 1/34
454/69

FOREIGN PATENT DOCUMENTS

| JP | 4345023 B2 | 10/2009 |
|----|------------|---------|
| JP | 2013139260 A | 7/2013 |

OTHER PUBLICATIONS

English Machine Translation of JP2004306713A.
English Machine Translation of JP2013139260A.
English Machine Translation of JP4345023B2.

\* cited by examiner

APPARATUS FOR PROVIDING INDEPENDENTLY CONTROLLED INDIRECT LIGHTING AND AIRSTREAM TO AN INDIVIDUAL PASSENGER OF A MOTOR VEHICLE

TECHNICAL FIELD

This document relates to a new and improved apparatus for independently controlling indirect lighting and the indirect delivery of conditioned air to an individual passenger of a motor vehicle.

BACKGROUND

In a ride share situation including, particularly, the situation of an autonomous transportation-as-a-service motor vehicle, the environmental controls should be simple and equal among each individual passenger. In other words, each individual should be able to control their own light level and intensity of airflow.

This document relates to a new and improved apparatus allowing an individual to easily control their own lighting and airflow. Advantageously, the lighting provided is indirect in order to reduce glare and the airflow provided is indirect in order to eliminate the annoyance of an individual often caused by the force an airstream blowing directly upon the individual.

SUMMARY

In accordance with the purposes and benefits described herein, a new and improved apparatus is provided for allowing an individual passenger of a motor vehicle to independently control his or her own indirect lighting and indirect airflow so as to maximize the individual's comfort while being transported from point to point in a motor vehicle. One such apparatus may be provided in the motor vehicle for each passenger or individual. Such an apparatus comprises a vent body including an air inlet and an air outlet, an air valve carried on the vent body and displaceable between an open position and a closed position and at least one flexible air guide carried on the vent body and adapted to direct air discharged from the air outlet toward the individual.

The apparatus may further include a light source carried on the vent body. That light source may be elongated and extend parallel to the air outlet along a longitudinal axis of the vent body.

The at least one flexible air guide may include an arcuate surface adapted to redirect air received from the air outlet and light received from the light source toward a single occupant or passenger of the motor vehicle without intruding upon the ride experience of other individual passengers that might be in that motor vehicle. By redirecting the airflow and light with the at least one flexible air guide, indirect lighting and airflow is provided to the individual so as to provide an enhanced travel experience.

A pivot may connect the air valve to the vent body. An operator handle is connected to the pivot. The operator handle is adapted to provide simple and efficient controls for adjusting the light and airflow provided by the apparatus to the individual passenger.

The vent body may further include at least one arm connecting the at least one flexible air guide to the vent body. The at least one arm and the at least one flexible air guide may include a first connection feature that connects the at least one arm to the at least one flexible air guide.

The vent body may also include at least one aligner element connecting the at least one flexible air guide to the vent body. The at least one aligner element and the at least one flexible air guide may include a second connection feature connecting the at least one aligner element to the at least one flexible air guide.

Still further, the first connection feature may include a first aperture adjacent a first corner of the at least one flexible air guide and a first channel in the at least one arm. A margin of the at least one flexible air guide surrounds the first aperture and is engaged in the first channel.

The second connection feature may include a second aperture adjacent a second corner of the at least one flexible air guide. A second channel, including a scoop pin, may be provided in the at least one aligner element. An edge of the at least one flexible air guide extends along that second channel with the scoop pin engaged in the second aperture. Here it should be noted that the second channel may extend in a diagonal direction to the longitudinal axis of the vent body so that the at least one flexible air guide has an elongated guide surface that is arcuate in cross section. It is this arcuate surface that provides for the indirect lighting and airflow to the individual passenger operating the apparatus. In at least one possible embodiment, the vent body, including the at least one arm and the at least one aligner element, is 3-D printed as a single body. This substantially reduces the number of parts and the cost of production.

Still further, the apparatus may include an outer shroud that is received around the vent body in order to enhance the aesthetic appearance of the apparatus. That outer shroud may include an open bottom and the at least one flexible air guide may project from that open bottom toward the individual operating the apparatus.

In the following description, there are shown and described several preferred embodiments of apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

Reference will now be made in detail to the present preferred embodiments of the apparatus, examples of which are illustrated in the accompanying drawing figures.

DETAILED DESCRIPTION

Figure 1:
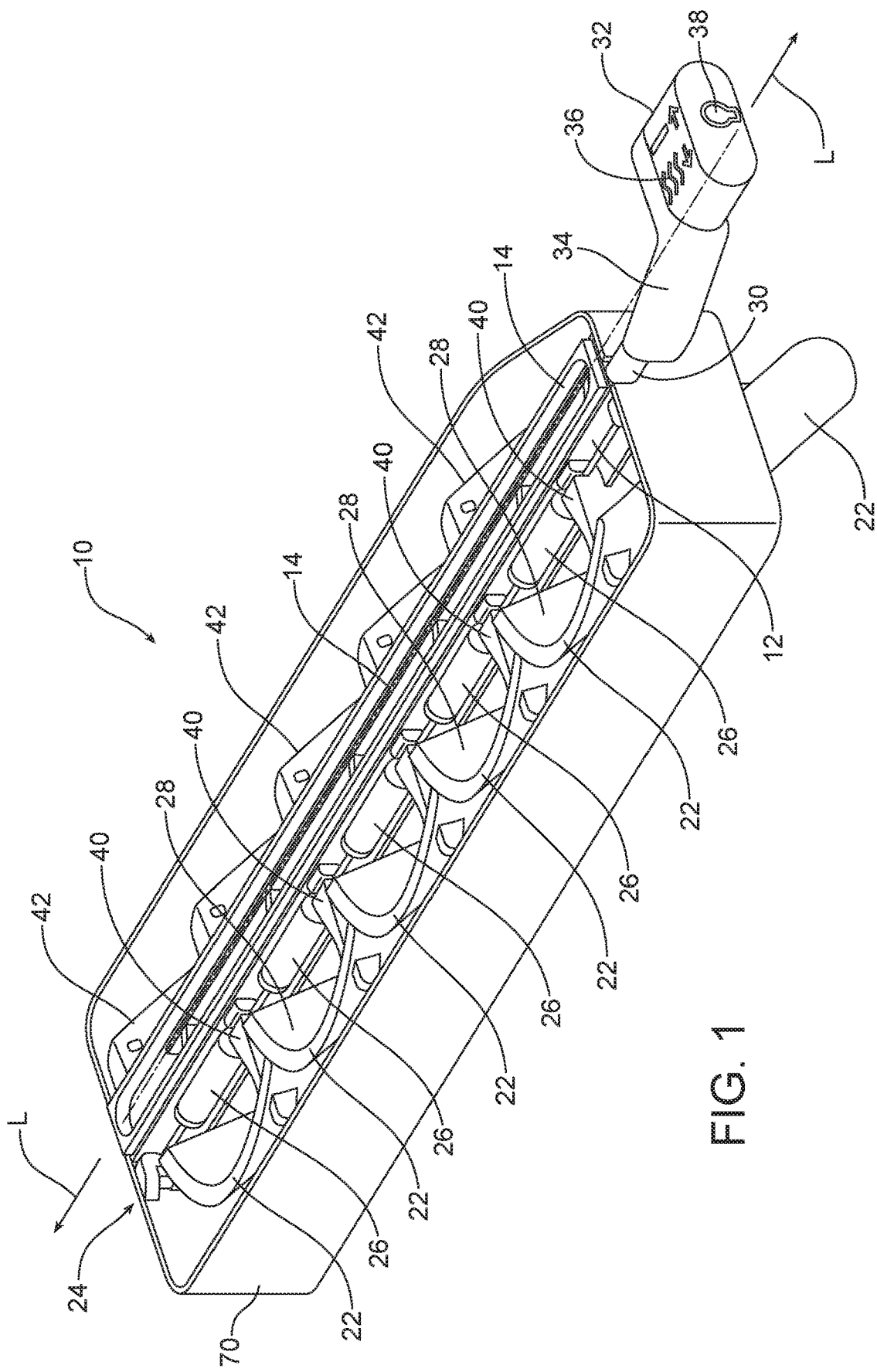
FIG. 1 is perspective view of the apparatus from above.
Figure 2A:
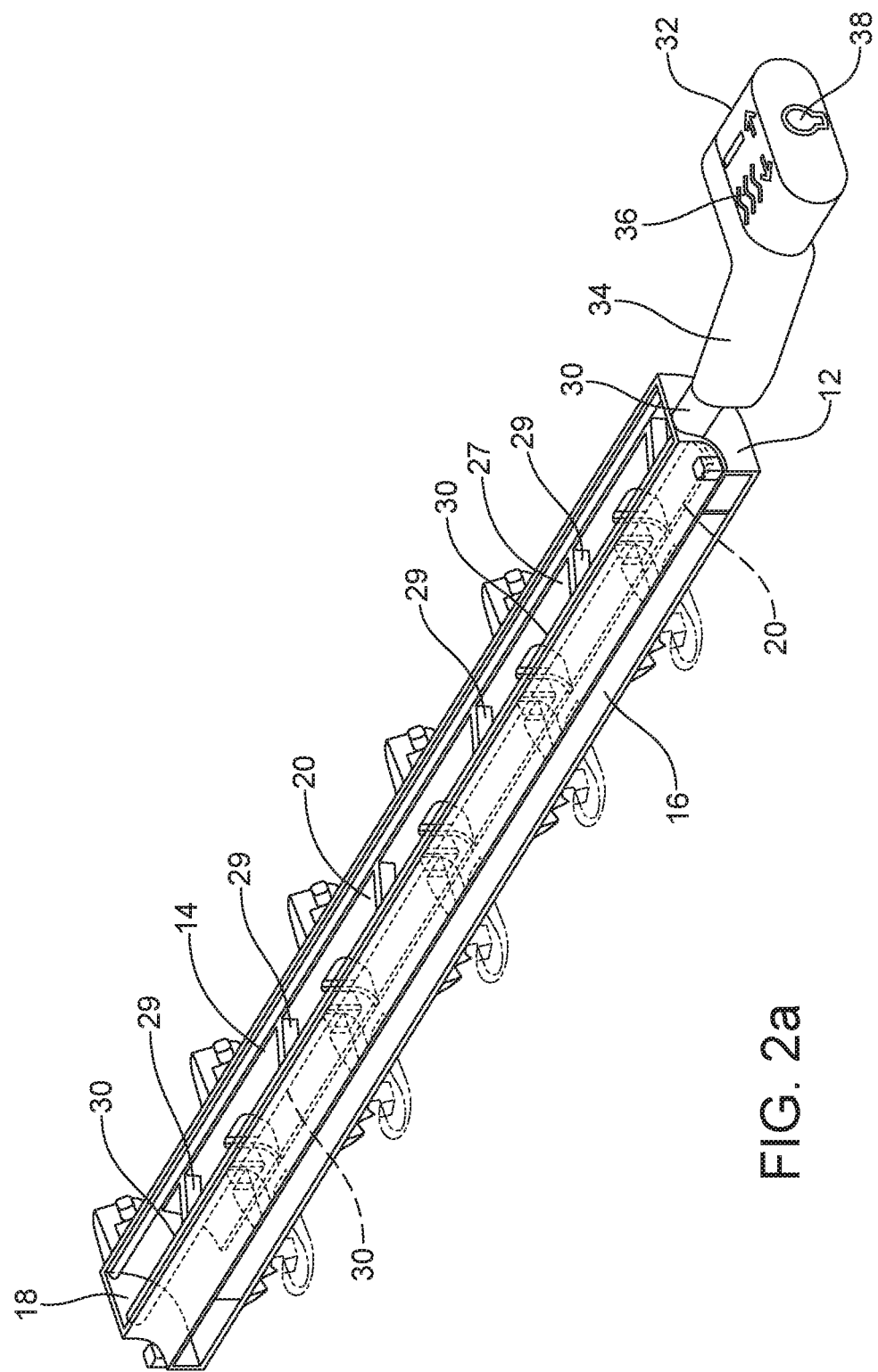
FIG. 2a is a detailed perspective view of a portion of the apparatus illustrated in FIG. 1 that shows the air valve within the vent body in the open position.
Figure 2B:
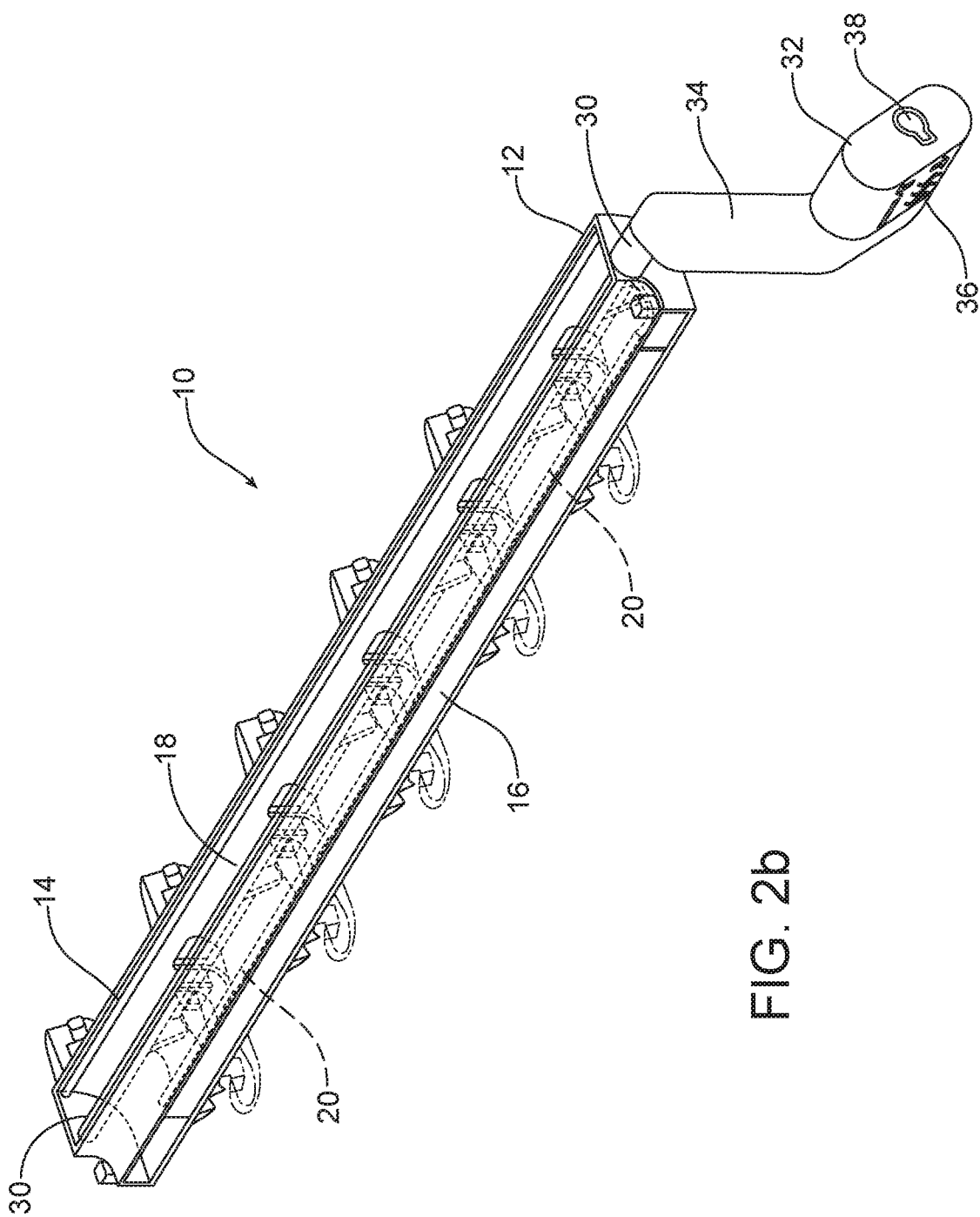
FIG. 2b is a detailed perspective view similar to that of FIG. 2a but illustrating the air valve in the closed position shutting off the discharge of airflow through the air outlet of the vent body.
Figure 2C:
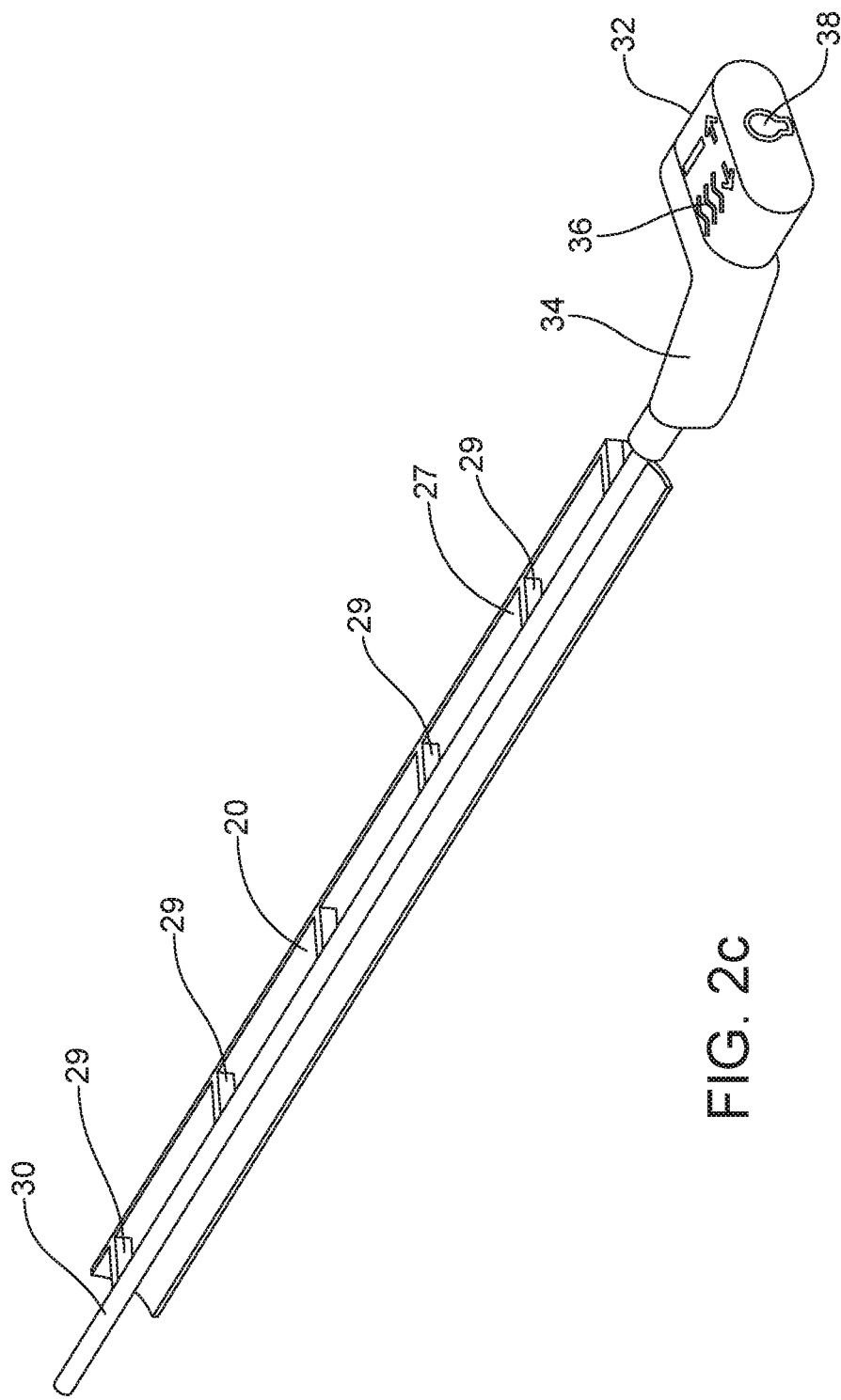
FIG. 2c is a detailed perspective view of the air valve.

Reference is now made to FIG. 1 which illustrates the fully assembled apparatus 10 adapted to allow individual control of indirect lighting and airflow to an individual passenger or occupant of a motor vehicle without adversely impacting the travel experience of other passengers in that motor vehicle. As best illustrated in FIGS. 1, 2a and 2b, the apparatus 10 includes a vent body 12 including an air inlet 14 and an air outlet 16. The air inlet 14 is adapted to receive conditioned air from a state-of-the-art climate control system (not shown) of a motor vehicle. One apparatus 10 of the type described may be provided along the roof line of a motor vehicle for each occupant seat. Each such apparatus 10 allows the individual seated in the adjacent occupant seat to individually control indirect lighting and indirect airflow in a manner preferred by that individual without adversely affecting or impacting upon the ride experience of any other individuals occupying the motor vehicle.

The vent body 12 includes an internal air manifold 18 between the air inlet 14 and the air outlet 16. An air valve 20 is carried on the vent body 12 in the air manifold 18. As illustrated, the air valve 20 is displaceable between an open position illustrated in FIG. 2a wherein an airstream may flow from the air manifold 18 and be discharged from the air outlet 16, and a closed position, illustrated in FIG. 2b wherein the air valve is positioned across the air outlet 16 to prevent the discharge of the airstream from the air outlet.

At least one flexible air guide 22 is carried on the vent body 12. In the illustrated embodiment, five flexible air guides 22 are provided. See, for example, FIG. 3a. Here it should be appreciated that the apparatus 10 may include any number of flexible air guides 22 desired or needed for any particular application.

A light source, generally designated by reference numeral 24, is carried on the vent body 12. As illustrated, the light source 24 is elongated and extends parallel to the air outlet 16 along a longitudinal axis L of the vent body 12. In the illustrated embodiment, the light source 24 comprises a plurality of light emitting diodes (LEDs) 26 with one LED juxtaposed to each flexible air guide 22. Here it should be appreciated that each flexible air guide 22 includes an arcuate surface 28 adapted to redirect air discharged or received from the air outlet 16 and light received from the light source 24 and, more particularly, the juxtaposed LED 26, toward the single occupant or individual passenger of the motor vehicle operating the apparatus 10.

More specifically, the air valve 20 includes an arcuate blade body 27, a plurality of support ribs 29 and a pivot 30 that connects the air valve 20 to the vent body 12. An operator handle 32 is connected to the pivot 30. In the illustrated embodiment, the handle 32 is connected to the pivot 30 by a crank arm 34. Vent icons 36 on the handle 32 indicate the direction of movement needed to close and open the air valve 20. These vent icons 36 are located on both the bottom and top of the handle 32 so that they can be seen when the handle is in the positions illustrated in FIGS. 2a and 2b. An actuator button 38 is provided on the handle 32. The actuator button 38 allows an individual to control the operation of the light source 24. For example, the actuator button 38 may be configured to control three levels of brightness with successive presses. The fourth press could turn off the light source 24.

As should be appreciated, the operator handle 32 is easily accessible by an individual and allows both the light and air discharged from the apparatus 10 to be conveniently controlled independently.

Figure 3A:
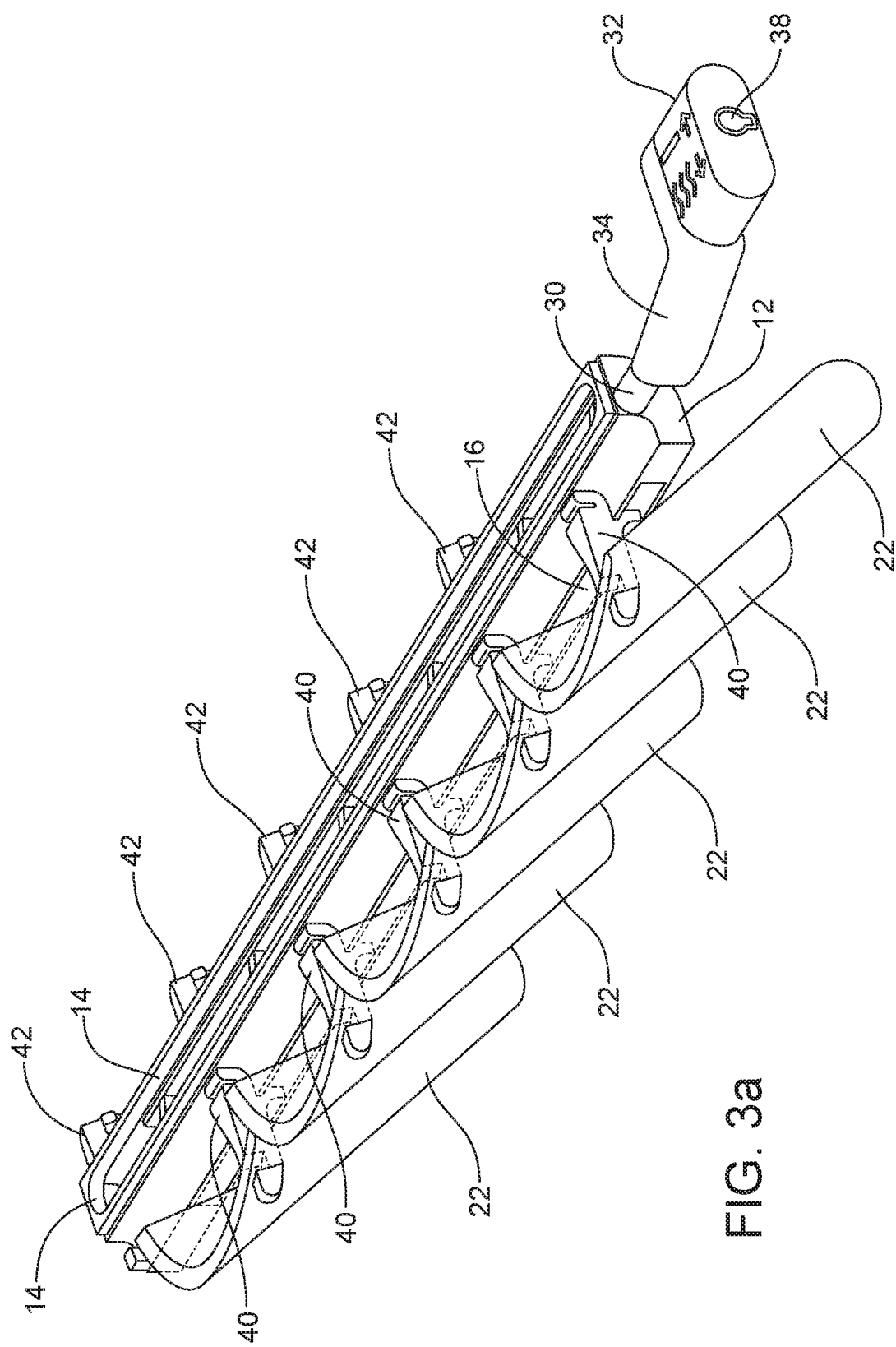
FIG. 3a is a detailed front perspective view of a portion of the apparatus illustrated in FIG. 1 illustrating how the flexible air guides are carried on the arms of the vent body.
Figure 3B:
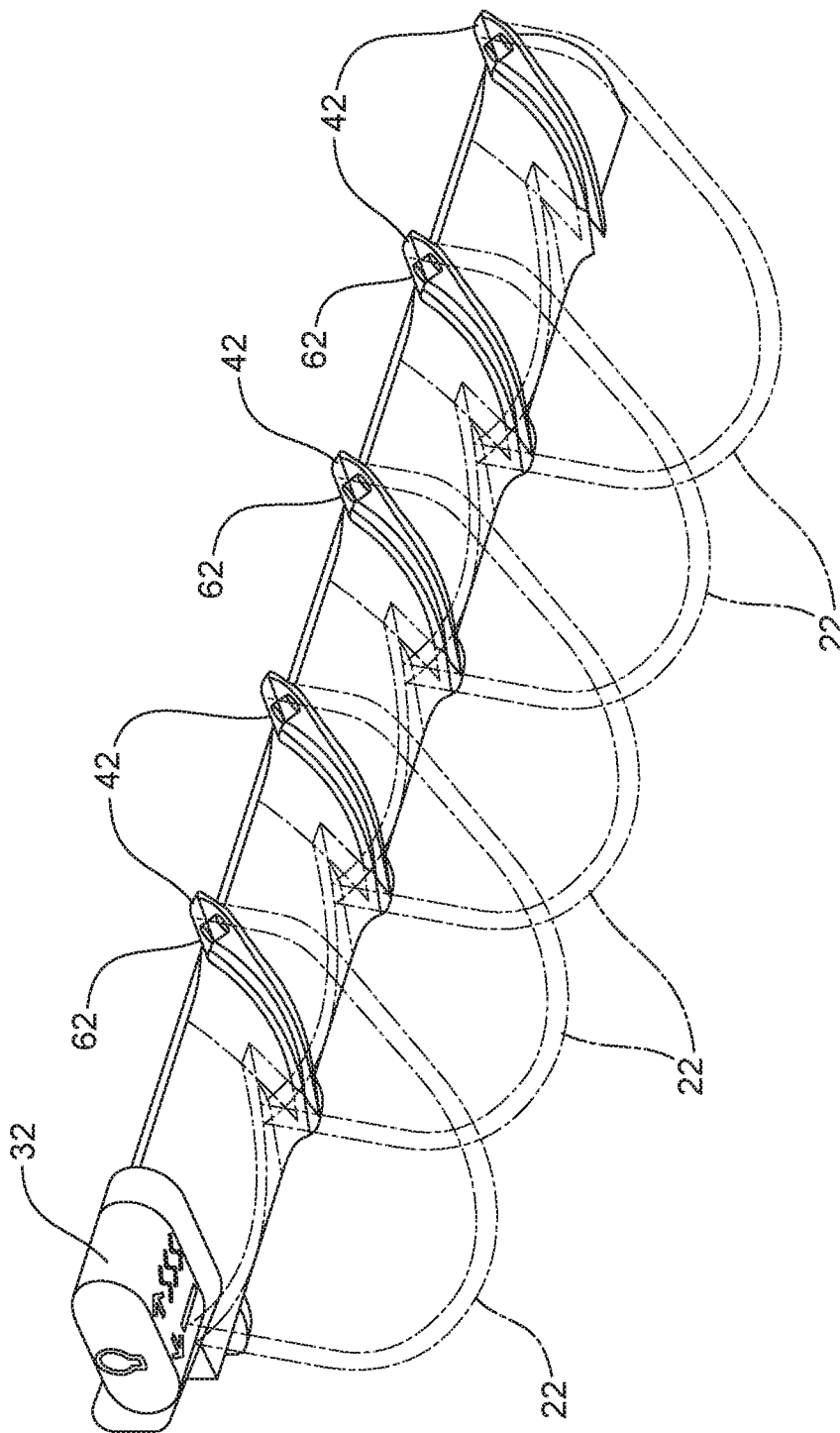
FIG. 3b is a detailed perspective view from below of a portion of the apparatus illustrated in FIG. 1 illustrating how the flexible air guides are attached to the aligner elements of the vent body.

As further illustrated in FIGS. 1, 3a and 3b, the vent body 12 includes at least one arm and at least one cooperating aligner element 42. More particularly, one arm 40 and one aligner element 42 are provided to secure each flexible air guide 22 to the vent body 12. In one of the many possible embodiments of the apparatus 10, the vent body 12, including the at least one arm 40 and the at least one aligner element 42, are 3-D printed as a single body. This reduces the number of parts and eliminates the time and expense of securing separate arms and aligner elements to the vent body thereby decreasing the cost of production.

Figure 4:
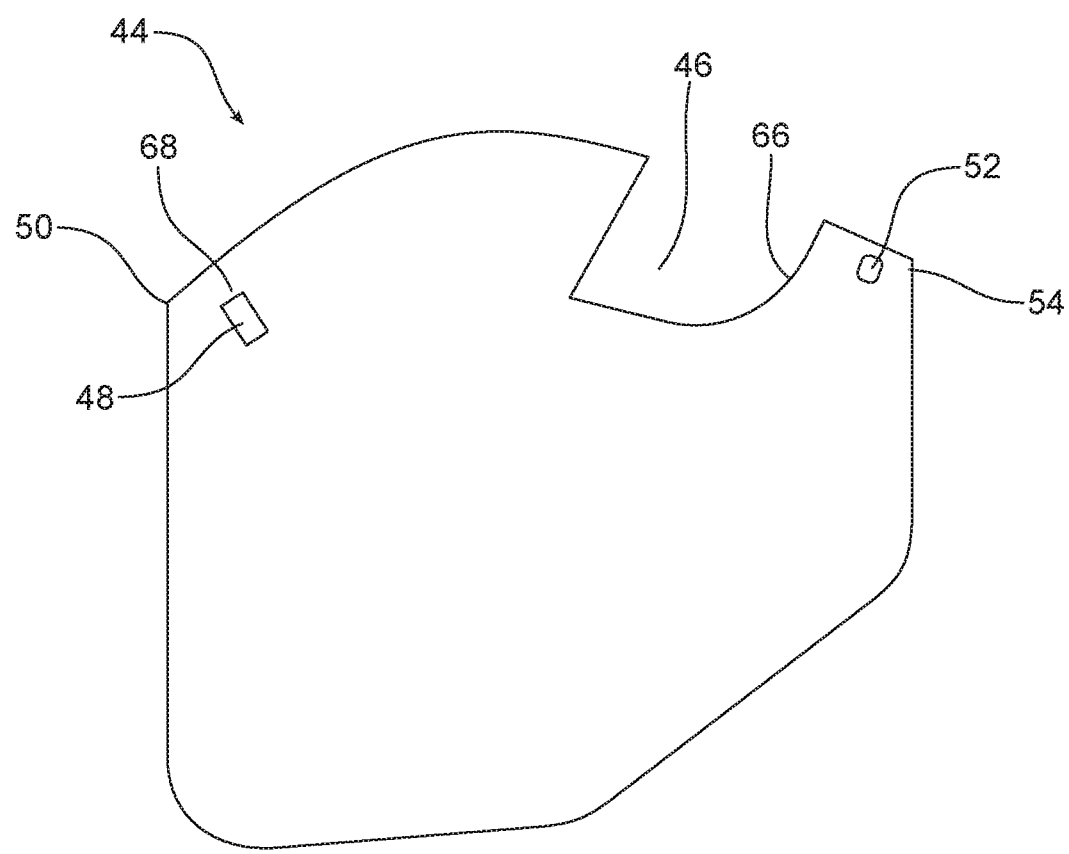
FIG. 4 is a detailed plan view of a sheet of flexible material from which each flexible air guide may be formed.

As illustrated in FIG. 4, each flexible air guide 22 is made from a sheet of flexible material such as 6 mm thick felt. Such material has sufficient body stiffness to hold its desired shape for redirecting the air stream received from the air outlet 16 as well as the desired softness to be substantially unnoticed if an individual passenger were to bump his or her head against it. FIG. 4 illustrates the sheet material 44 in a rolled-flat condition. As illustrated, the sheet material 44 includes a vent body cutout 46 in the perimeter thereof between a first aperture 48 adjacent a first corner 50 and a second aperture 52 adjacent a second corner 54.

Figure 5:
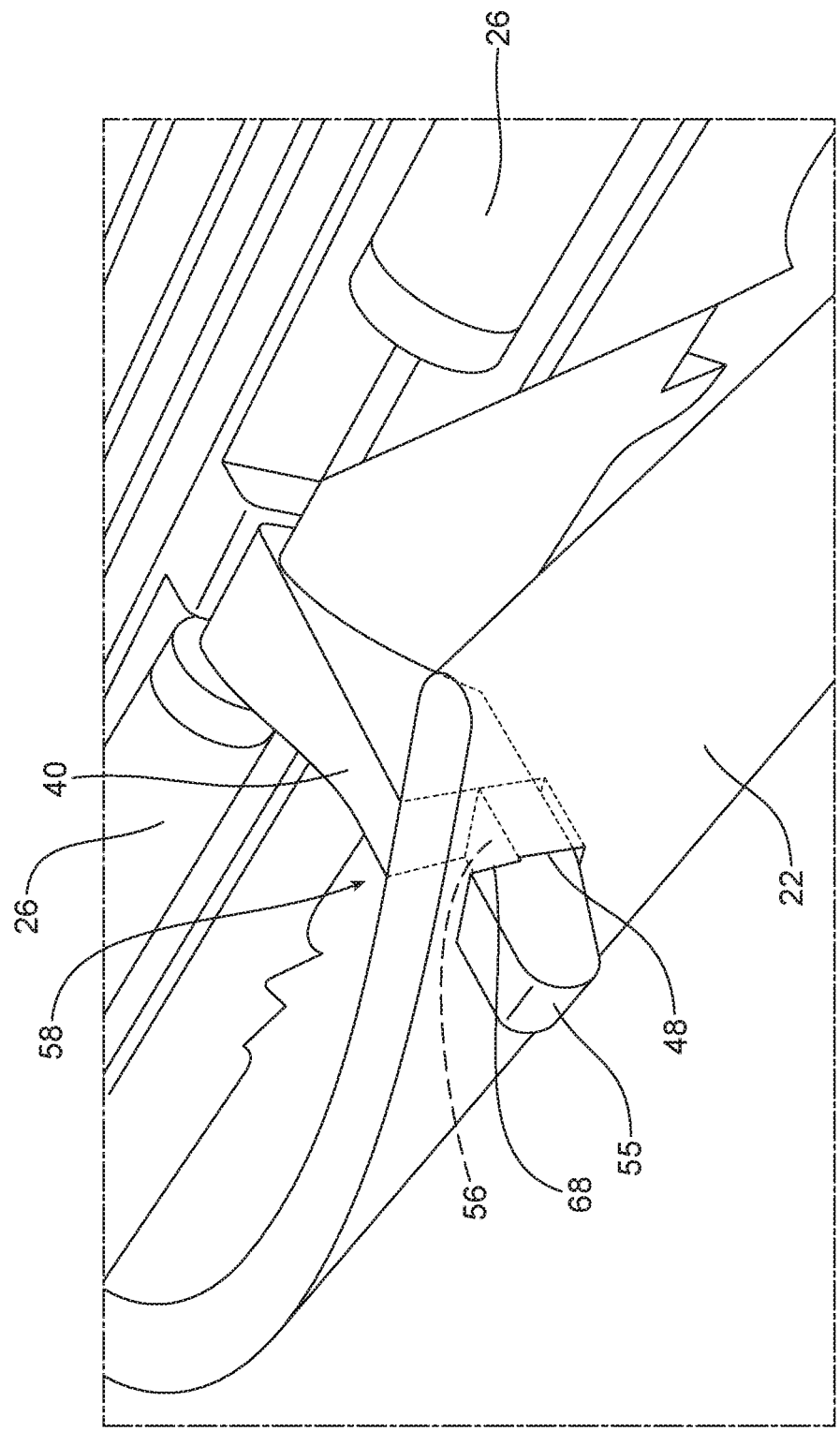
FIG. 5 is a detailed perspective view of the first connection feature connecting one flexible air guide to one arm.
Figure 6:
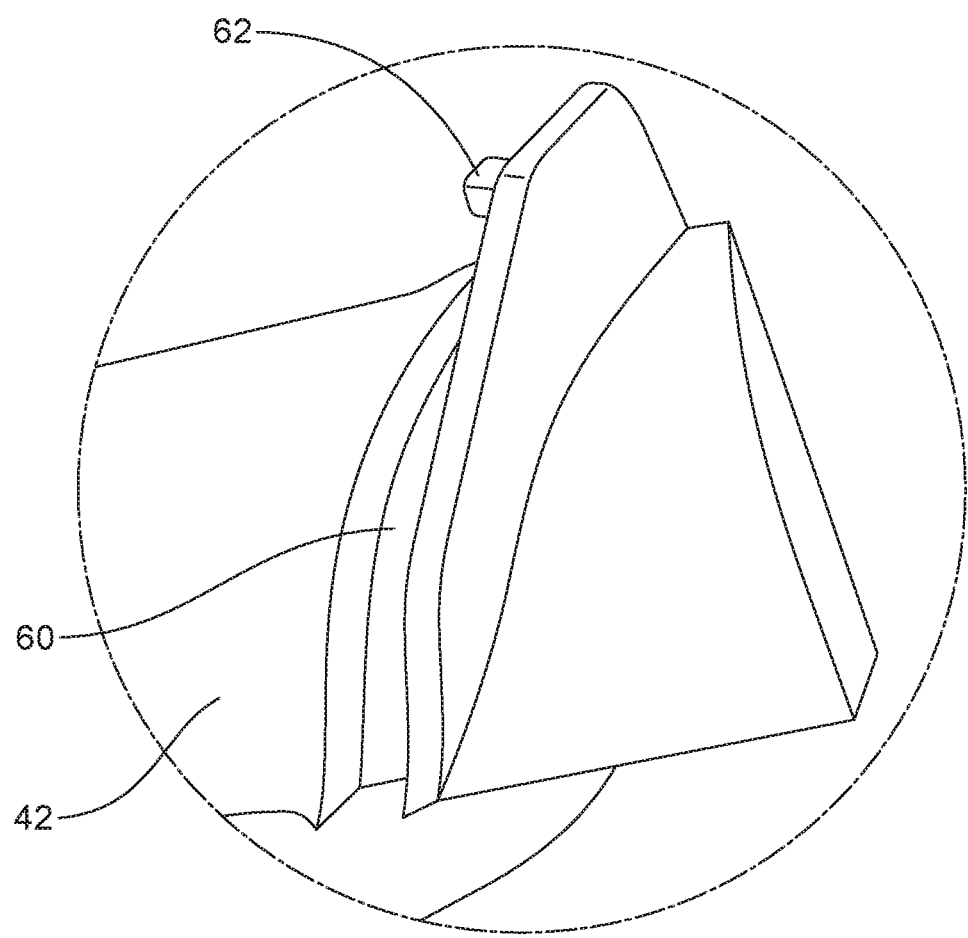
FIG. 6 is a detailed perspective view of the second channel and scoop pin incorporated into each aligner element.
Figure 7:
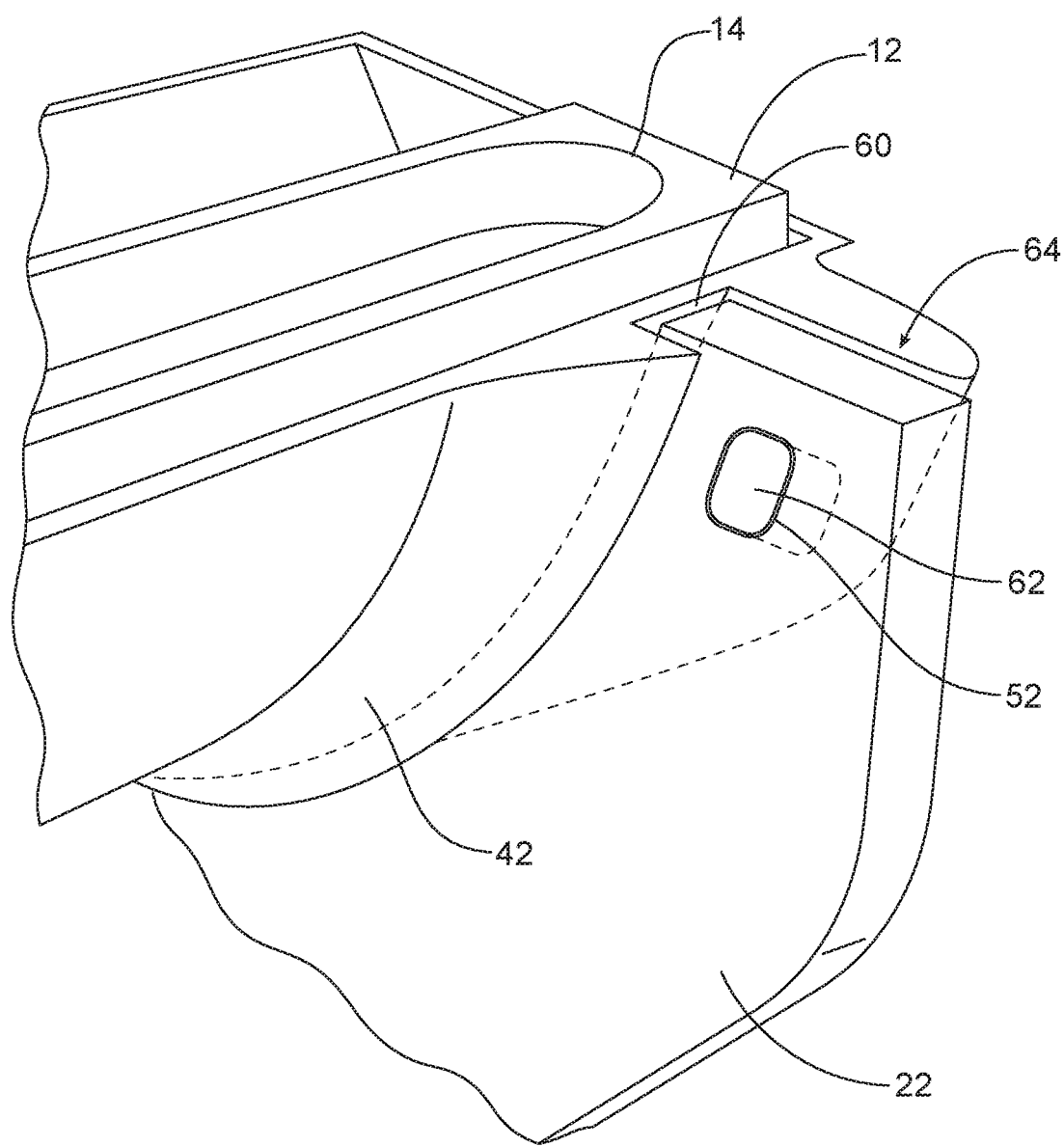
FIG. 7 is a detailed perspective view illustrating the second connection feature that connects one flexible air guide to one aligner element for that flexible air guide.

Each arm 40 includes a rounded nose 55 and a first channel 56 adjacent that nose. The first aperture 48 in the sheet material 44/flexible air guide 22 and the first channel 56 in the arm 40 comprise a first connection feature 58 for connecting the flexible air guide 22 to the vent body 12. See particularly FIGS. 1 and 5.

Each aligner element 42 includes a second channel 60 including a scoop pin 62. As should be appreciated, the second channel 60 is curved and elongated so that the second channel extends in a diagonal direction to the longitudinal axis L of the vent body 12. Together, (a) the second aperture 52 in the sheet material 44/flexible air guide 22 and (b) the second channel 60 and scoop pin 62 on the aligner element 42 comprise a second connection feature 64 for securing the flexible air guide 22 to the vent body 12. Each flexible air guide 22 may be quickly attached to the vent body 12. First the edge 66 is inserted in the second channel 60 and the scoop pin 62 is engaged in the second aperture 52. The sheet material 44 is then manipulated so as to fully seat the vent body cutout 46 around the vent body 12 and then folded so as to allow the rounded nose 54 of the arm 40 to be inserted into the first aperture 48.

The margin 68 of the sheet material 44/flexible air guide 22 surrounding the first aperture 48 is then engaged in the first channel 56 of the arm 40 in order to complete the connection. As a result of the folding of the sheet material 44 in the manner described, the flexible air guide 22 is arcuate in cross section, thereby providing the arcuate surface 28 that is adapted to efficiently and effectively redirect airflow from the air outlet 16 and light from the light source 24 toward the individual passenger controlling the operation of the apparatus 10 through the operator handle 32. The resulting distribution of softer and more pleasant indirect light and less annoying indirect airflow toward the individual passenger functions to enhance the travel experience of the individual passenger allowing that individual passenger to customize his light and airflow environment without adversely affecting other individuals in the motor vehicle.

As should be further appreciated from reviewing FIG. 1, the apparatus 10 also includes an outer shroud 70 that is received around the vent body 12. The outer shroud 70 includes an open bottom (hidden from view in FIG. 1) through which the flexible air guides 22 project. As should be appreciated, the outer shroud 70 enhances the aesthetic appearance of the apparatus 10.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a vent body including an air inlet and an air outlet;
   an air valve carried on said vent body and displaceable between an open position and a closed position;
   at least one flexible air guide carried on said vent body and adapted to direct air from said air outlet; and
   a light source carried on said vent body, wherein said light source is elongated and extends parallel to said air outlet along a longitudinal axis of said vent body.

2. The apparatus of claim 1, wherein said at least one flexible air guide includes an arcuate surface adapted to redirect air received from said air outlet and light received from said light source toward a single occupant of a motor vehicle.

3. The apparatus of claim 2, wherein said air valve includes a pivot connecting said air valve to said vent body and an operator handle connected to said pivot.

4. The apparatus of claim 1, further including an outer shroud received around said vent body.

5. The apparatus of claim 4, wherein said outer shroud includes an open bottom, said at least one flexible air guide projecting from said open bottom.

6. An apparatus, comprising:
   a vent body including an air inlet and an air outlet;
   an air valve carried on said vent body and displaceable between an open position and a closed position; and
   at least one flexible air guide carried on said vent body and adapted to direct air from said air outlet, wherein said vent body further includes at least one arm connecting said at least one flexible air guide to said vent body.

7. The apparatus of claim 6, wherein said at least one arm and said at least one flexible air guide include a first connection feature connecting said at least one arm to said at least one flexible air guide.

8. The apparatus of claim 7, wherein said vent body includes at least one aligner element connecting said at least one flexible air guide to said vent body.

9. The apparatus of claim 8, wherein said at least one aligner element and said at least one flexible air guide, include a second connection feature connecting said at least one aligner element to said at least one flexible air guide.

10. The apparatus of claim 9, wherein:
    (a) said first connection feature includes a first aperture adjacent a first corner of said at least one flexible air guide and a first channel in said at least one arm, a margin of said at least one flexible air guide surrounding said first aperture being engaged in said first channel; and
    (b) said second connection feature includes a second aperture adjacent a second corner of said at least one flexible air guide and a second channel including a scoop pin in said at least one aligner element, an edge of said at least one flexible air guide extending along said second channel with said scoop pin engaged in said second aperture.

11. The apparatus of claim 10, wherein said second channel extends in a diagonal direction to a longitudinal axis of said vent body.

12. The apparatus of claim 8, wherein said vent body, including said at least one arm and said at least one aligner element, is 3-D printed as a single body.

13. The apparatus of claim 12, wherein said flexible air guide is arcuate in cross section.

14. The apparatus of claim 13, further including a light source carried on said vent body.

15. The apparatus of claim 14, wherein said light source is elongated and extends parallel to said air outlet along a longitudinal axis of said vent body.

16. The apparatus of claim 15, wherein said at least one flexible air guide includes an arcuate surface adapted to redirect air received from said air outlet and light received from said light source toward a single occupant of a motor vehicle.

17. The apparatus of claim 16, further including a pivot connecting said air valve to said vent body and an operator handle connected to said pivot.

* * * * *